H. SHOEMAKER & F. W. MIDGLEY.
ELECTRICAL CONDENSER AND PROCESS OF MAKING SAME.
APPLICATION FILED MAY 4, 1909.
928,224. Patented July 13, 1909.
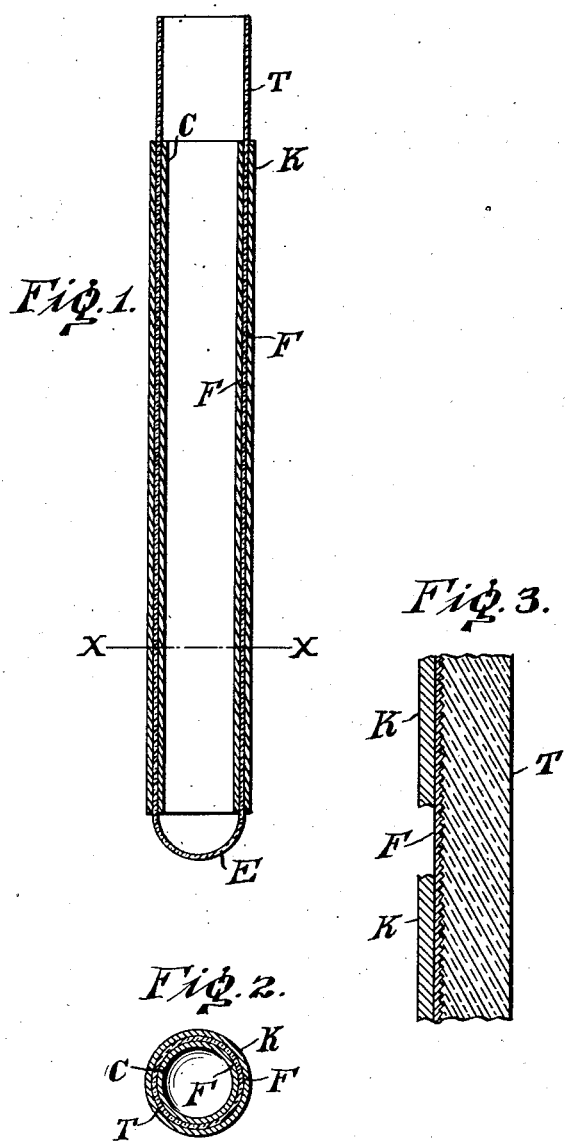

UNITED STATES PATENT OFFICE.

HARRY SHOEMAKER AND FREDERICK W. MIDGLEY, OF JERSEY CITY, NEW JERSEY.

ELECTRICAL CONDENSER AND PROCESS OF MAKING SAME.

No. 928,224.

Specification of Letters Patent.

Patented July 13, 1909.

Original application filed January 8, 1909, Serial No. 471,229. Divided and this application filed May 4, 1909. Serial No. 493,885.

*To all whom it may concern:*

Be it known that we, HARRY SHOEMAKER and FREDERICK W. MIDGLEY, citizens of the United States, residing at Jersey City, county of Hudson, and State of New Jersey, have invented new and useful Improvements in Electrical Condensers and Processes of Making Same, of which the following is a specification.

Our invention relates to an electrical condenser, and process of making same, particularly useful in connection with high potential current such as employed in the transmitting apparatus of wireless signaling systems.

Our invention resides in a condenser having a glass or other vitreous dielectric, the condenser armatures or coatings consisting of a conducting material ground off by and forced into intimate relation and contact with a roughened surface of the glass or other vitreous material; and upon this coating may be applied by electro-deposition a second coating. The process of so coating the glass or other vitreous material is described and claimed in our application Serial No. 471,229, filed January 8, 1909, of which this application is a division.

For an illustration of one of the forms our invention may take, reference is to be had to the accompanying drawing, in which:

Figure 1 is a vertical cross sectional view of one form of condenser of our invention. Fig. 2 is a horizontal cross sectional view on the line X—X of Fig. 1. Fig. 3 is a fragmentary sectional view, on enlarged scale, illustrating the glass or other material and the two coatings.

The condenser jar or tube consists of the cylindrical tube or jar T of glass or other vitreous insulating material, being closed at the lower end as shown at E. As frequently used in wireless signaling transmitting apparatus, these tubes are approximately two inches in external diameter and approximately sixteen inches in length, though it is to be understood that our invention is not limited in any way to tubes or jars of these dimensions. On the inner wall of the tube T is a coating C, whose thickness is shown exaggerated, of copper or other conducting material applied to the surface of the tube or jar by the process about to be described. And on the exterior surface of the jar or tube T is a similar coating K, also shown of exaggerated thickness, applied by the same process.

To those portions of the tube or jar T which are not to be plated or coated is applied a coating of wax or other suitable material. The exposed surfaces are then subjected to hydro-fluoric acid, or other suitable material, which acts upon the glass or vitreous material leaving a rough sharp surface, as illustrated by Fig. 3. Or the rough surface may be produced by other than chemical means. The rough sharp surface is then brought into contact with a copper or other brush, which is rotated at high speed. In consequence, copper in finely divided form is ground off of the brush by the rough sharp surface of the glass or other material, and at the same time this finely divided copper is substantially hammered into the roughened surface of the glass. By the continuous grinding, rubbing and burnishing effect on the brush, for the period of some minutes, an extremely thin film, F, (see Fig. 3) of coper or metal adheres to the glass or other material, the adhesion being very firm indeed. The copper or other coating is perfectly smooth and burnished on the exposed side, that is, on the side opposite the glass or other material. And, as thus applied, this preliminary coating F adheres most firmly, and it is difficult indeed to separate the same from the surface of the glass or other material. After this preliminary coating, which covers the surface, copper or other material is electroplated on this preliminary coating to the required thickness. The result is a perfectly uniform metallic coating which is in most intimate, close and firm contact with the glass, there being no air or gas spaces between the coating and the glass. Such air or gas spaces would be detrimental, especially when the glass and coating form a condenser of wireless signaling apparatus involving high potential current.

A condenser made according to this process has long life, is satisfactory electrically, and is not so subject to breakage as in earlier forms of condensers. The cost of making a condenser as above described is comparatively small when considering the excellence of the resulting condensers and their long life. The condenser herein illustrated is, in fact, a Leyden jar or vial, and it is to be understood that our invention is equally applicable to Leyden jars or condensers of other shapes and sizes.

What we claim is:

1. An electrical condenser comprising glass or vitreous material having a roughened surface, and a coating on the roughened surface consisting of conducting coating material in intimate and firm engagement with said surface.

2. An electrical condenser comprising glass or vitreous material having a roughened surface, a preliminary coating consisting of conducting material in intimate and firm engagement with said surface, and another coating deposited upon said preliminary coating.

3. An electrical condenser comprising glass or vitreous material having a roughened surface, a preliminary coating consisting of conducting material in intimate and firm engagement with said surface, and another coating electrically deposited upon said preliminary coating.

4. An electrical condenser comprising a tube or jar of glass or other vitreous dielectric material having inside and outside roughened surfaces, a preliminary coating consisting of conducting material in intimate and firm engagement with said surfaces, and another coating electrically deposited upon said preliminary coating.

5. The process of making an electrical condenser which comprises roughening opposed surfaces of vitreous dielectric material, subjecting conducting material to the grinding action of said roughened surfaces and lodging the ground-off material in firm and intimate contact with said roughened surfaces to form preliminary coatings, and then depositing conducting coatings upon said preliminary coatings.

6. The process of making an electrical condenser which comprises roughening opposed surfaces of vitreous dielectric material, subjecting conducting material to the grinding action of said roughened surfaces and lodging the ground-off material in firm and intimate contact with said roughened surfaces to form preliminary coatings, and then electrically depositing conducting coatings upon said preliminary coatings.

7. The process of making an electrical condenser which comprises roughening opposed surfaces of vitreous dielectric material, forcing particles of metallic material into firm and intimate contact with said roughened surfaces to form preliminary coatings, and then electrically depositing conducting coatings upon said preliminary coatings.

In testimony whereof we have hereunto affixed our signatures in the presence of the two subscribing witnesses.

HARRY SHOEMAKER.
FREDK. W. MIDGLEY.

Witnesses:
ROBERT McCABE,
M. F. CARROLL.